United States Patent [19]
Sung et al.

[11] Patent Number: 5,953,092
[45] Date of Patent: Sep. 14, 1999

[54] LIQUID CRYSTAL DEVICE WITH SPLIT PIXEL ELECTRODES AND WITH INTERMEDIATE ELECTRODES USED FOR BISECTING EACH OF THE PIXEL REGIONS

[75] Inventors: Chae Gee Sung; Hyunho Shin, both of Miyagi-ken, Japan

[73] Assignee: Frontec Incorporated, Miyagi, Japan

[21] Appl. No.: 08/959,000

[22] Filed: Oct. 28, 1997

[30] Foreign Application Priority Data

Oct. 28, 1996 [JP] Japan ................................. 8-285655

[51] Int. Cl.⁶ .................................................. G02F 1/1343
[52] U.S. Cl. ............................................. 349/143; 349/141
[58] Field of Search ........................................ 349/143, 141

[56] References Cited

U.S. PATENT DOCUMENTS

| | | | |
|---|---|---|---|
| 5,786,876 | 7/1998 | Ota et al. .................................. | 349/42 |
| 5,835,171 | 10/1998 | Hanazawa et al. ........................ | 349/43 |
| 5,838,411 | 11/1998 | Hayakawa et al. ....................... | 349/139 |
| 5,844,644 | 12/1998 | Oh et al. .................................. | 349/95 |

FOREIGN PATENT DOCUMENTS

| | | |
|---|---|---|
| 07199190 | 8/1995 | Japan . |
| 07301814 | 11/1995 | Japan . |
| 08022023 | 1/1996 | Japan . |

*Primary Examiner*—William L. Sikes
*Assistant Examiner*—Heidi L. Eisenhut
*Attorney, Agent, or Firm*—Brinks Hofer Gilson & Lione

[57] ABSTRACT

A liquid-crystal display device having liquid crystal provided between a pair of opposed substrates includes a common electrode formed on a surface of one substrate facing the liquid crystal; surrounding electrodes formed on a surface of the other substrate facing the liquid crystal, the surrounding electrodes provided for defining a plurality of pixel regions, to which surrounding electrodes a potential equal to that of the common electrode is applied; intermediate electrodes formed on the surface of the other substrate, the intermediate electrodes provided for bisecting each pixel region; pixel electrodes formed on the surface of the other substrate for the pixel regions, to which pixel electrodes a potential equal to that of the intermediate electrodes is applied; and gaps formed on the pixel electrodes along the direction in which the intermediate electrodes are arranged, each gap provided for bisecting each pixel electrode in accordance with the width of each intermediate electrode.

4 Claims, 6 Drawing Sheets

FIG. 3A
FIG. 3B
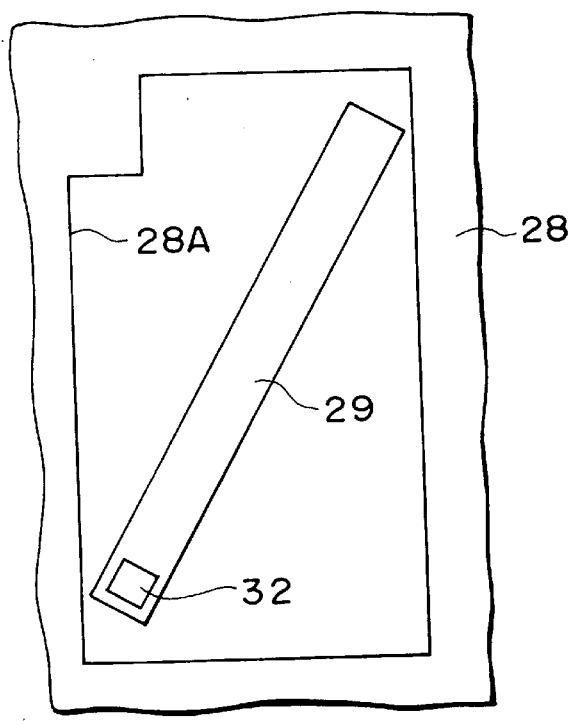
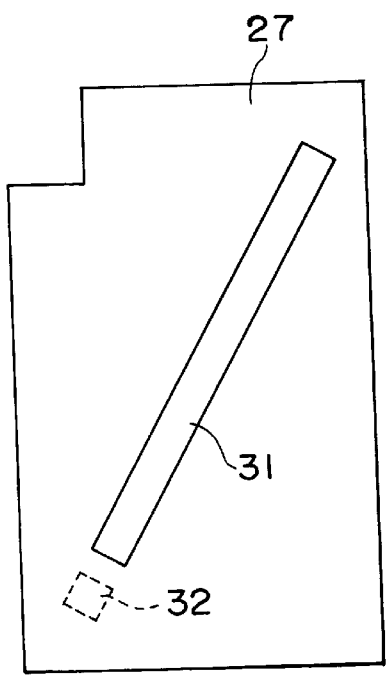

LIQUID CRYSTAL DEVICE WITH SPLIT PIXEL ELECTRODES AND WITH INTERMEDIATE ELECTRODES USED FOR BISECTING EACH OF THE PIXEL REGIONS

BACKGROUND OF THE INVENTION

1. Field of the Invention

The present invention relates to liquid-crystal display devices in which pixel electrodes are formed, such as thin-film-transistor liquid-crystal display devices and passive-matrix liquid-crystal display devices, and in particular, to a liquid-crystal display device formed by techniques for causing pixel electrodes to generate lines of electric force, which is effective in driving the liquid crystal, and for reducing the number of masks used to form layers.

2. Description of the Related Art

FIG. 6 shows an example of the structure of a general liquid-crystal display device. The liquid-crystal display device A of this type has a pair of opposed substrates 1 and 2, liquid crystal 3 provided therebetween, and polarizers 4 and 5 disposed on the external surfaces of the substrates 1 and 2. When the liquid-crystal display device A is a thin-film-transistor type, on the substrate 1 there are arranged source interconnections and gate interconnections in the form of a matrix, and there are provided thin film transistors as switching devices and pixel electrodes on regions at which the source interconnections and the gate interconnections intersect. On the other substrate 2 is formed a common electrode. By supplying a potential difference between the pixel electrodes on the regions and the common electrode opposed thereto so as to apply a desired electric field to the liquid crystal provided between both electrodes, the alignment of the liquid crystal can be controlled.

Also, when the liquid-crystal display device A is a passive matrix type, strip electrodes are formed on the substrates 1 and 2 so as to be in the form of a matrix. By applying an electric field to the liquid crystal in regions where the upper and lower electrodes intersect, the alignment of the liquid crystal can be controlled.

In addition, according to the liquid-crystal display device A, in order to efficiently apply an electric field to the liquid crystal provided between the substrates 1 and 2 it is important to arrange the pattern of lines of electric force generated between the pixel electrodes on the substrate 1 and the common electrode on the substrate 2 having the liquid crystal therebetween.

Accordingly, as shown in FIG. 7, there is shown a conventional liquid-crystal display device B including each pixel electrode 7 formed on a substrate 6 and counter electrodes 9 formed on another substrate 8, in which the counter electrodes 9 are formed by bisection by a slit 10 formed to be opposed to the center of the pixel electrode 7, and a peripheral electrode 12, peripheral to the pixel electrode 7, is embedded in an insulating film 11, with the counter electrodes 9 and the peripheral electrode 12 being grounded.

In the liquid-crystal display device B having the structure shown in FIG. 7, a pattern of lines of electric force is regularly generated from the middle of the pixel electrode 7 to the slit 10 between the counter electrodes 9, and the pattern of lines of electric force, peripheral to the pixel electrode 7, is curved downward as shown in FIG. 7. Thus, the pattern of lines of electric force in the middle of the pixel electrode is uniform, and the pattern of lines of electric force, peripheral to the pixel electrodes, is distorted, so that the alignment direction of the liquid crystal changes along the lines of electric force, and the viewing-angle range of the liquid-crystal display device advantageously expands. However, the liquid-crystal display device B has the following defects.

According to the structure shown in FIG. 7, it is required that the position of the slit 10 be opposed to the center of the pixel electrode 7 and the positions of ends of the counter electrodes 9 be adjusted to the periphery of the pixel electrode 7. However, even if the present substrate alignment technique is used, it is difficult to reduce an error in the alignment of the substrates 6 and 8. If the position of the slit 10 is off the center of the pixel electrode 7, and the positions of the peripheries of the counter electrodes 9 are off the periphery of the pixel electrodes 7, the above requirement cannot be satisfied, which causes a possibility of destroying the pattern of lines of electric force.

By comparing the liquid-crystal display device B with a conventional liquid-crystal display device having a general structure using a continuous electrode without the slit 10 as a counter electrode, it is found that the counter electrode 9 needs to be patterned and an additional one mask is necessary when using a lithographic technique to form the counter electrode 9. Accordingly, the production process is complicated, which disadvantageously reduces the yield.

SUMMARY OF THE INVENTION

Accordingly, it is an object of the present invention to provide a liquid-crystal display device in which a pattern of liquid crystal is arranged on both sides of each gap for bisecting each pixel electrode by arranging a pattern of lines of electric force on both sides of each gap, which expands the viewing-angle range of the liquid-crystal display device, and the driving power used when driving the liquid crystal by an electrical field is increased by arranging the pattern of lines of electric force generated by the pixel electrodes. In producing the liquid-crystal display device the production process can be simplified by reducing the number of masks needed for production, and the yield can be advantageously improved.

To this end, the foregoing object has been achieved through provision of a liquid-crystal display device comprising: liquid crystal provided between a pair of opposed substrates; a common electrode formed on a surface of one substrate facing the liquid crystal; surrounding electrodes formed on a surface of the other substrate facing the liquid crystal, the surrounding electrodes provided for defining a plurality of pixel regions, to which surrounding electrodes a potential equal to that of the common electrode is applied; intermediate electrodes formed on the surface of the other substrate, the intermediate electrodes provided for bisecting each pixel region; pixel electrodes formed on the surface of the other substrate for the pixel regions, to which pixel electrodes a potential equal to that of the intermediate electrodes is applied; and gaps formed on the pixel electrodes along the direction in which the intermediate electrodes are arranged, each gap provided for bisecting each pixel electrode in accordance with the width of each intermediate electrode.

Preferably, each gap is formed along a diagonal of each pixel electrode having a rectangular shape.

A video signal may be applied to the pixel electrodes and the intermediate electrodes, and the common electrode and the surrounding electrodes may be grounded to have zero potential.

The intermediate electrodes may be formed in the shapes of strips, and the longitudinal direction of each intermediate electrode may be arranged so as to coincide with the alignment-processed direction of an alignment layer formed on the surface of the other substrate.

According to the present invention, the existence of intermediate electrodes having potential equal to that of pixel electrodes arranges a pattern of lines of electric force directed to common electrodes, which increases the driving power used when driving liquid crystal. By arranging the pattern of lines of electric force on both sides of each gap for bisecting each pixel electrode, the alignment directions of the liquid crystal can be arranged on both sides of each gap, which enables the right-and-left or upper-and-lower equal expansion of the viewing-angle range of a liquid-crystal display device.

By causing the lines of electric force in the periphery of each pixel electrode so as to be distorted, the alignment directions of the liquid crystal change along the lines of electric force, which expands the viewing-angle range of the liquid-crystal display device.

The formation of each gap along a diagonal of each pixel electrode bisects each pixel electrode into two triangular regions, which enables the right-and-left or upper-and-lower equal expansion of the viewing-angle range, and which causes the viewing-angle range to align with the alignment-processed direction of an alignment layer.

BRIEF DESCRIPTION OF THE DRAWINGS

FIG. 3A is a plan view showing part of a surrounding electrode and an intermediate electrode, formed in the structure shown in FIG. 1, and FIG. 3B is a plan view showing a pixel electrode formed in the same structure.

DESCRIPTION OF THE PREFERRED EMBODIMENTS

Embodiments of the present invention will be described below.

Figure 1:
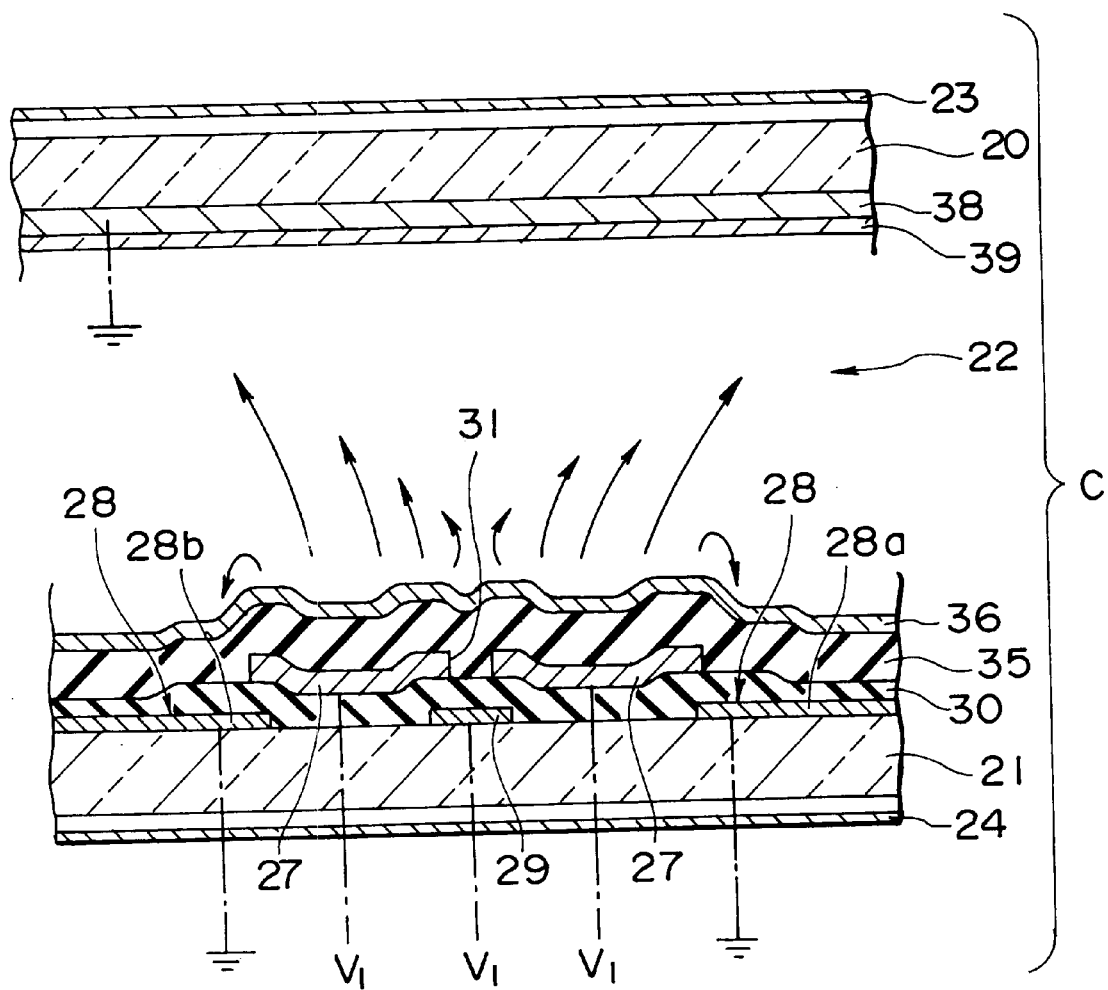
FIG. 1 is a cross-sectional view showing a liquid-crystal display device according to an embodiment of the present invention.
Figure 2A:
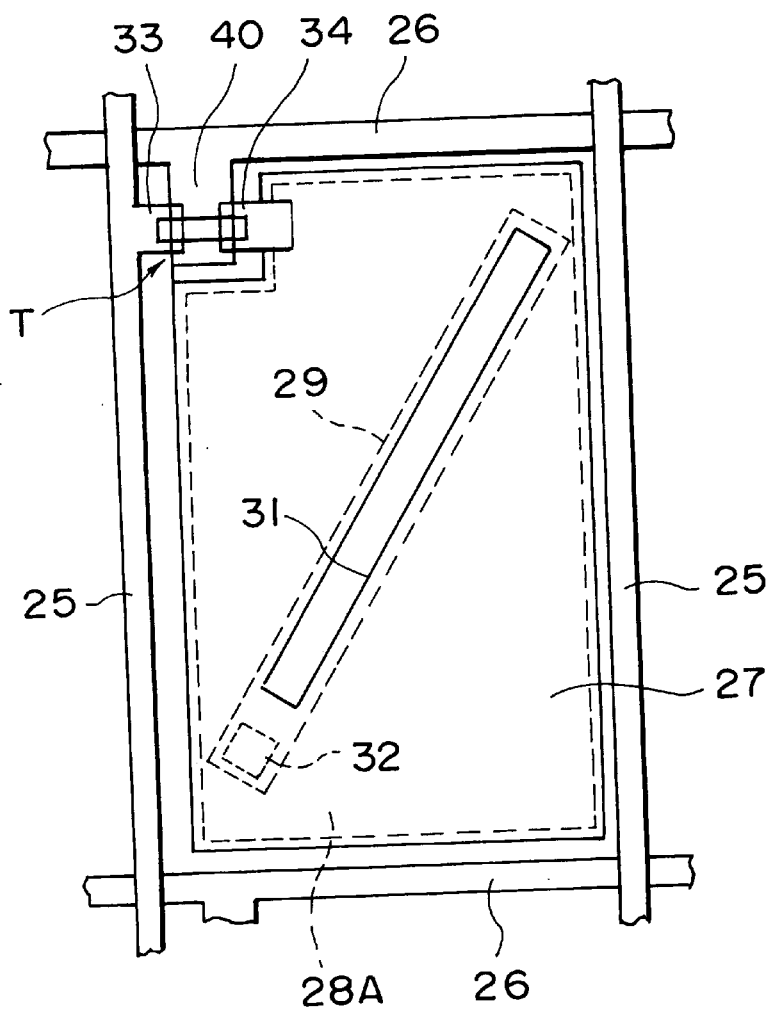
FIG. 2A is a plan view chiefly showing the liquid-crystal display device shown in FIG. 1.
Figure 2B:
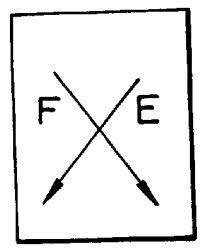
FIG. 2B is a chart showing the alignment direction of the alignment layer.

FIGS. 1, 2A, 2B and 3A, 3B show a thin-film-transistor liquid-crystal display device according to an embodiment of the present invention. The liquid-crystal display device C has a pair of opposed substrates 20 and 21, a liquid-crystal layer 22 provided therebetween, and polarizers 23 and 24 provided on the external surfaces of the substrates 20 and 21. As shown in FIGS. 2A and 2B, on one substrate 21 are formed source interconnections 25 and gate interconnections 26 in the form of a matrix, and each pixel electrode 27 is formed in one rectangular region surrounded by the source interconnection 25 and the gate interconnection 26.

Figure 4:
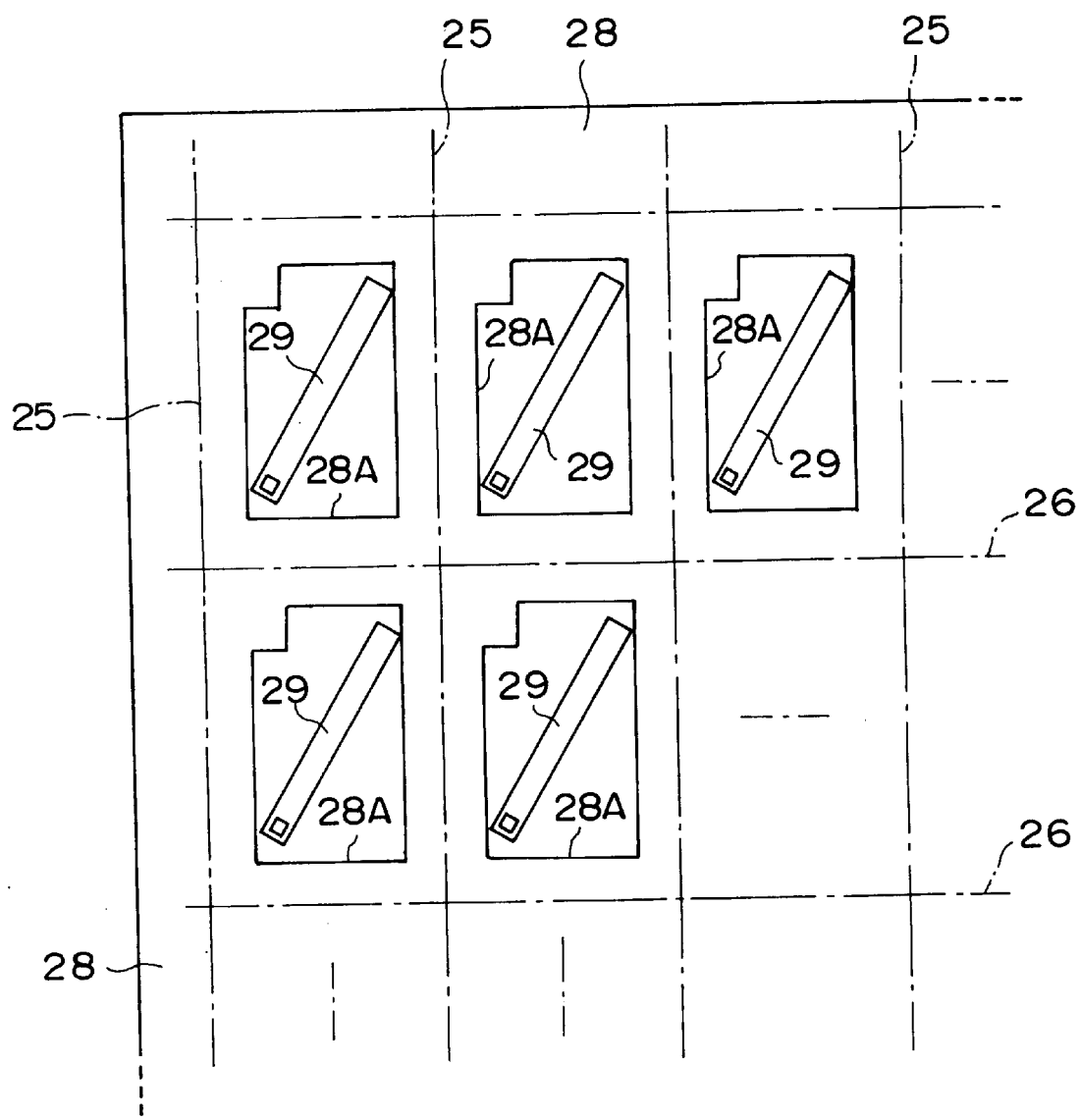
FIG. 4 is a schematic plan view showing surrounding electrodes and intermediate electrodes.

As shown in FIG. 3A or FIG. 4, on the substrate 21 on which the pixel electrodes 27 are formed, surrounding electrodes 28 are initially formed. In the surrounding electrodes 28, throughholes 28A which have substantially the same outline shapes as the pixel electrodes 27 and which are slightly smaller than pixel electrodes 27 are formed in the rectangular regions surrounded by the source interconnections 25 and the gate interconnections 26. In the throughholes 28A, strip intermediate electrodes 29 provided along diagonals of the throughholes 28A are formed so as to be away from the surrounding electrodes 28.

Since the pixel electrodes 27 are formed in the regions formed by the source lines 25 and the gate interconnections 28, the throughholes 28A and the intermediate electrodes 29 surrounded by the surrounding electrodes 28 are formed in the respective regions formed by the source interconnections 25 and the gate interconnections 26.

As shown in FIG. 1, an insulating layer 30 is formed to cover the surrounding electrode 28 and the intermediate electrode 29, and the pixel electrode 27 is formed on the insulating layer 30.

As shown in FIG. 3B, the pixel electrode 27 is formed in the form of a substantial rectangle. The pixel electrode 27 is disposed (as shown in FIG. 2A) so as to cover the surrounding electrode 28 and so that its periphery is slightly outer than the periphery 28A of the surrounding electrode 28.

In addition, a slit-shaped gap 31 which is slightly narrower than the intermediate electrode 29 positioned downward is formed along a diagonal of the pixel electrode 27, and the pixel electrode 27 is roughly divided by the gap 31 into two triangular regions. In a corner of the pixel electrode 27, at one end of the gap 31, a conduction portion 32 connected to the intermediate electrode 29 via a contact hole penetrating the insulating layer 30 is formed. Accordingly, the intermediate electrode 29 and the pixel electrode 27 are electrically connected, and the same electrical potential can be applied thereto.

The reason why the intermediate electrode 29 is wider than the gap 31 is that a margin for masking adjustment in producing this type of structure by layer formation is required.

As shown in FIG. 2A, at one side end of the pixel electrode 27 is formed a thin film transistor T as a switching device including a gate electrode 40 formed extending from the gate interconnection 26, a source electrode 33 formed extending from the source interconnection 25, and a drain electrode 34 formed extending from one side end of the pixel electrode 27.

An insulating layer 35 is formed so as to cover the pixel electrode 27, the thin film transistor T and the insulating layer 30. An alignment layer 36 is further formed on the insulating layer 35. On the alignment layer 36 there is provided the liquid crystal 22.

The polarizers 23 and 24 provided on the external surfaces of the substrates 20 and 21 are used for adjustment to the polarization angle of TN (twisted nematic) liquid crystal which is generally used in the thin-film-transistor liquid-crystal display device. When 90°—twisted nematic liquid crystal is used, the upper and lower polarizers 23 and 24 are positioned so that their polarization angles intersect at 90°.

Also, when 90°—twisted nematic liquid crystal is used, the alignment layers 36 and 39 formed on the substrates 20 and 21 are rubbed so that their alignment directions intersect at 90°. The directions in such a case are directions E and F shown in FIG. 2B. It is preferable that one of the directions coincide with the longitudinal direction of the intermediate electrode 29, or both have an almost identical angle.

In addition, on the other substrate 20 to the liquid crystal 22 there are formed a common electrode 38 consisting of a continuous electrode and the alignment layer 39 covering the common electrode 38. Although a color filter to be provided on the substrate 20 in a color-display structure is omitted in the structure shown in FIG. 1, it need hardly be said that the color filter may be provided.

According to the liquid-crystal display device C having the above-described structure, similar to the conventional thin-film-transistor liquid-crystal display device, by inputting necessary driving signals to the source interconnection 25 and the gate interconnection 26 so that electric potential is supplied to the desired-positional pixel electrodes 27, the alignment of the liquid-crystal molecules can be controlled by potential difference generated between the pixel electrodes 27 and the common electrode 38, which enables switching between display and non-display conditions.

In the structure, for example, the common electrode 38 and the surrounding electrode 28 are grounded to zero potential as shown in FIG. 1, and a predetermined driving video-signal voltage $V_1$ is applied to the pixel electrodes 28 and the intermediate electrode 29. By applying the voltage $V_1$, lines of electric force generated in the periphery of the pixel electrode 27 are dense so as to be attracted to curve downward to the surrounding electrode 28, and lines of electric force generated from the edge of the pixel electrode 27, along the gap 31, repel the electrical field generated by the intermediate electrode 29 so as to be dense upward.

As a result, the pattern of the lines of electric force generated from the pixel electrode 27 to the common electrode 38 can be arranged in regions excluding the upper region of the gap 31 and the upper region of the pixel-electrode periphery, which results in improving the driving efficiency of the liquid crystal.

Figure 7:
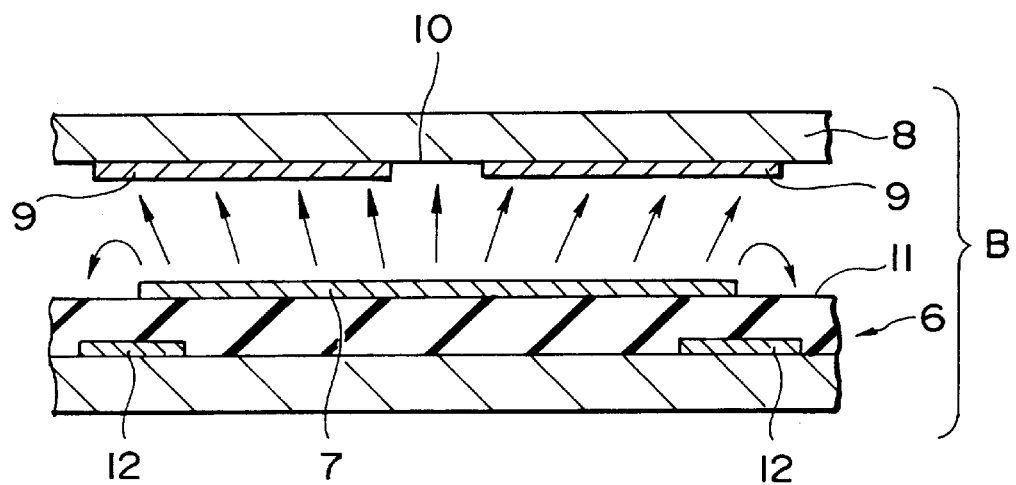
FIG. 7 is a cross-sectional view showing an example of the electrode structure of a conventional liquid-crystal display device.

In the structure shown in FIG. 1 the pattern of lines of electric force can be arranged as described, and the common electrode 38 may be totally formed on the substrate 20. Thus, the need of the slit 10 which is essential in the conventional structure shown in FIG. 7 is eliminated. This eliminates the need for pattern formation by the lithography process, which advantageously reduces the number of masks needed in production. Compared with the structure shown in FIG. 7, it is required in the structure shown in FIG. 1 that the surrounding electrode 28 and the intermediate electrode 29 must be formed on the substrate 21. The formation of the electrodes 28 and 29 is simultaneously achieved in the step of forming a conductive film on the whole surface 21, and patterning the film. Thus, the surrounding electrode 28 and the intermediate electrode 29 can be formed without increasing the number of steps in the production process.

The conventional structure shown in FIG. 7 has a problem in which the upper and lower substrates 6 and 8 must be positioned with strict precision in order to adjust the position of the slit 10 and the position of the pixel electrode 7. To the contrary, employment of the structure (shown in FIG. 1) according to the present invention makes it possible to provide the whole-surface common electrode 38 on the substrate 20. Thus, the positioning of the upper and lower substrates 20 and 21 does not require high precision, compared with the precision required in the conventional structure shown in FIG. 7. Accordingly, the operation of aligning the substrates 20 and 21 is simpler than that in the conventional structure.

In addition, in the structure shown in FIG. 1 the alignment precision in the film formation can be applied unchanged to the alignment of the pixel electrode 27 with respect to the surrounding electrode 28 and the intermediate electrode 29. Thus, the alignment of the pixel electrode 27 can be performed with much finer precision than with the alignment precision of the upper and lower substrates. Accordingly, by employing the structure shown in FIG. 1, an advantage equivalent to or higher than the advantage obtained by arranging the pattern of lines of electric force in the structure shown in FIG. 7 can be obtained. Also, the structure shown in FIG. 1 provides advantages in which the substrates 20 and 21 can be easily aligned in production, the number of masks needed for film formation can be reduced, and the production process is not complicated.

Figure 5:
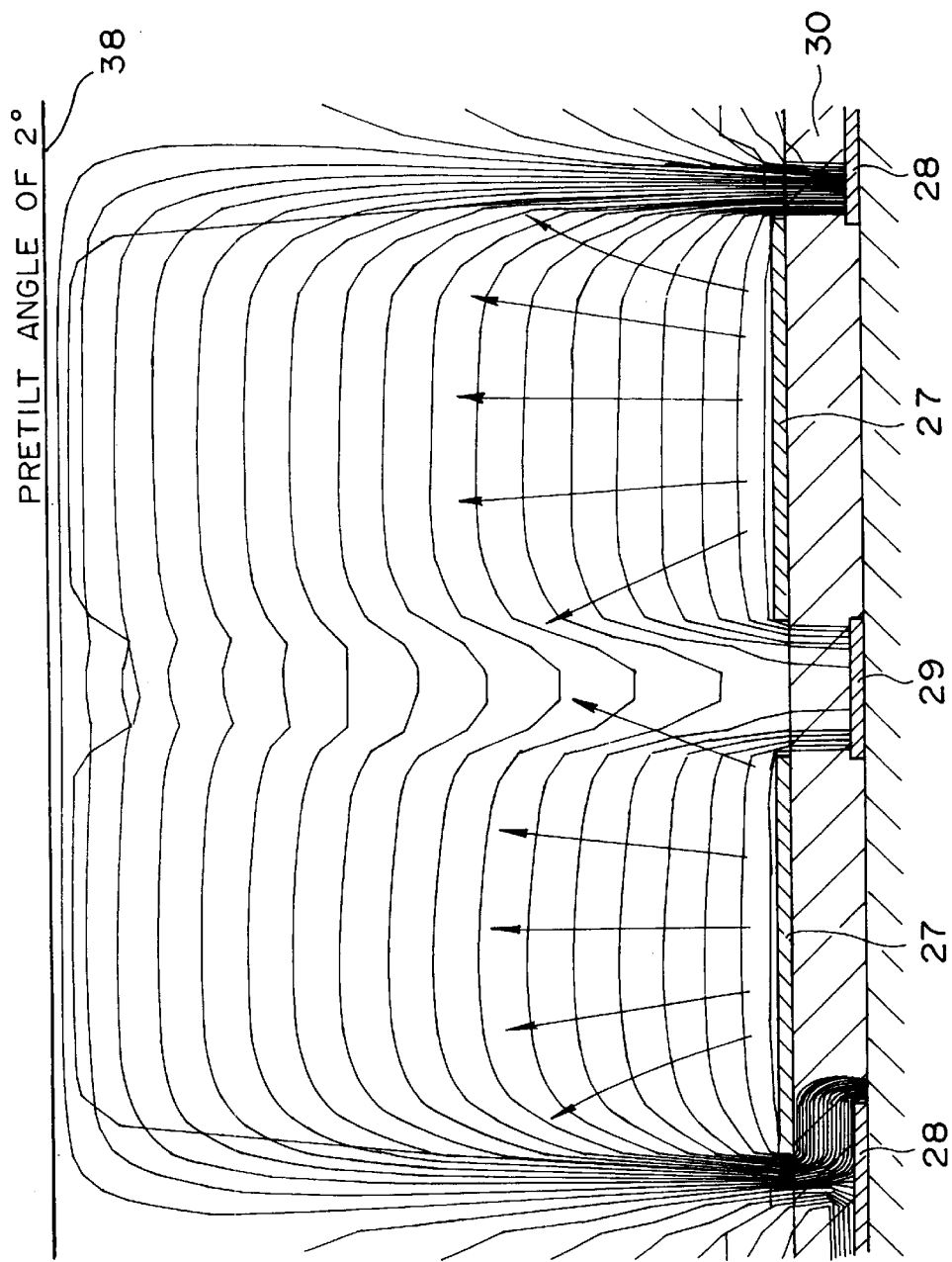
FIG. 5 is a chart showing lines of electric force obtained by simulation in the structure shown in FIG. 1.
Figure 6:
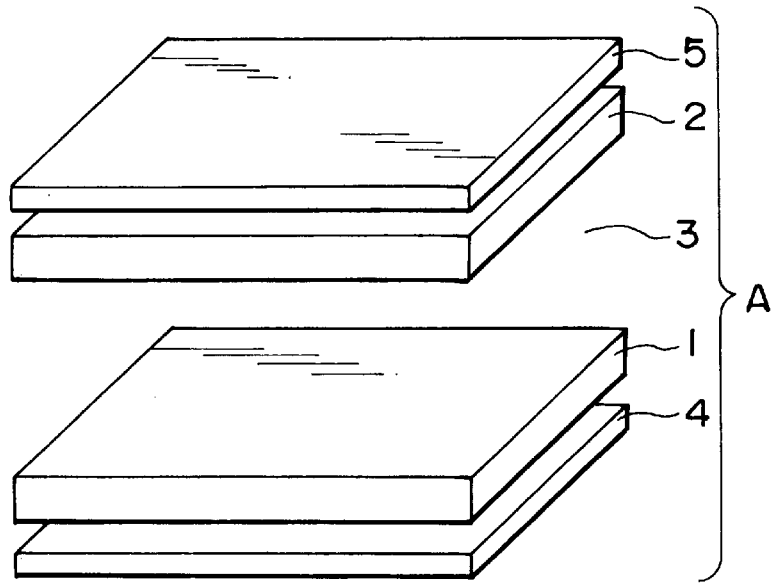
FIG. 6 is an exploded perspective view showing an example of a conventional liquid-crystal display device.

FIG. 5 shows simulated lines of electric force applied to the liquid crystal, obtained when the electrode structure shown in FIG. 1 is employed.

FIG. 5 shows the result where the pretilt angle of the liquid crystal, caused by the alignment film, is two degrees.

In the structure shown in FIG. 5, the surrounding electrode 28 is 6 $\mu$m wide, the intermediate electrode 29 is 7 $\mu$m wide, the pixel-electrode gap 31 is 5 $\mu$m wide, the insulating layer 30 is 0.3 $\mu$m wide, the distance between the upper and lower substrates and the cell gap are 4.4 $\mu$m, a voltage to be applied to the pixel electrode 27 and the intermediate electrode 29 is set to 5 V, and the potential of the surrounding electrode 29 and the potential of the common electrode 38 are set to zero V.

The curves shown in FIG. 5 represent equipotential lines. The lines of electric force are perpendicular to the equipotential lines. From the result shown in FIG. 5 it is understood that the employment of the structure according to the present invention can distort the pattern of lines of electric force at the pixel-electrode periphery, and the alignment direction of the liquid crystal can be changed along the lines of electric force, which expands the viewing-angle range of the liquid-crystal display device. It is also understood that the formation of the gap along the diagonal of the pixel electrode divides the pixel electrode into two triangular regions, which enables the right-and-left or upper-and-lower equal expansion of the viewing-angle range.

What is claimed is:

1. A liquid-crystal display device comprising:

liquid crystal provided between a pair of opposed substrates;

a common electrode formed on a surface of one of said pair of substrates facing the liquid crystal;

surrounding electrodes formed on a surface of the other of said pair of substrates facing the liquid crystal, said surrounding electrodes provided for defining a plurality of pixel regions, to which surrounding electrodes a potential equal to that of said common electrode is applied;

intermediate electrodes formed on the surface of said other substrate, said intermediate electrodes provided for bisecting each of said pixel regions;

pixel electrodes formed on the surface of the other substrate for said pixel regions, to which pixel electrodes a potential equal to that of said intermediate electrodes is applied; and gaps formed on said pixel electrodes along a direction in which said intermediate electrodes are arranged, each of said gaps provided for bisecting each of said pixel electrodes in accordance with the width of each of said intermediate electrodes.

2. A liquid-crystal display device according to claim 1, wherein each of said gaps is formed along a diagonal of each of said pixel electrodes having a rectangular shape.

3. A liquid-crystal display device according to claim 1, wherein a video signal is applied to said pixel electrodes and said intermediate electrodes, and said common electrode and said surrounding electrodes are grounded to have zero potential.

4. A liquid-crystal display device according to claim 1, wherein said intermediate electrodes are formed in the shapes of strips, and the longitudinal direction of each of said intermediate electrodes is arranged so as to coincide with the alignment-processed direction of an alignment layer formed on the surface of the other substrate.

\* \* \* \* \*